(12) United States Patent
Ito et al.

(10) Patent No.: US 7,273,908 B2
(45) Date of Patent: Sep. 25, 2007

(54) CHLOROSULPHONATED ETHYLENE-α-OLEFIN COPOLYMER AND METHOD FOR PRODUCING THE SAME

(75) Inventors: Nobuyuki Ito, Shunan (JP); Seiichi Shimomura, Shunan (JP); Tuneo Hironaka, Hofu (JP); Hideyoshi Nakamura, Shunan (JP)

(73) Assignee: Tosoh Corporation, Yamaguchi (JP)

( * ) Notice: Subject to any disclaimer, the term of this patent is extended or adjusted under 35 U.S.C. 154(b) by 129 days.

(21) Appl. No.: 11/156,459

(22) Filed: Jun. 21, 2005

(65) Prior Publication Data
US 2005/0288449 A1    Dec. 29, 2005

(30) Foreign Application Priority Data
Jun. 24, 2004    (JP) .................. P. 2004-186149

(51) Int. Cl.
*C08F 8/20* (2006.01)
*C08F 8/38* (2006.01)
*C08F 8/36* (2006.01)

(52) U.S. Cl. ................ 525/333.9; 525/334.1; 525/355; 525/383; 525/333.7; 525/343; 525/344

(58) Field of Classification Search ............. 525/333.9, 525/334.1, 355, 383, 333.7, 343, 344
See application file for complete search history.

(56) References Cited

FOREIGN PATENT DOCUMENTS

| | | | |
|---|---|---|---|
| JP | 61-120810 A | | 6/1986 |
| JP | 1-38407 B2 | | 8/1989 |
| JP | 09-176394 | * | 7/1997 |

* cited by examiner

*Primary Examiner*—Roberto Rabago
(74) *Attorney, Agent, or Firm*—Sughrue Mion Pllc.

(57) ABSTRACT

A chlorosulphonated ethylene-α-olefin copolymer having a chlorine content of 0.5-20% by weight and a glass transition temperature in differential scanning calorimetry (DSC) of −50° C. or lower and being crystalline. The chlorosulphonated ethylene-α-olefin copolymer is obtained by chlorinating a crystalline ethylene-α-olefin copolymer having a density of 890 kg/m³ or lower, obtained by copolymerizing α-olefin comprising a hydrocarbon having 4 or more carbon atoms, with ethylene, and then chlorosulphonating the chlorinated copolymer.

5 Claims, No Drawings

CHLOROSULPHONATED ETHYLENE-α-OLEFIN COPOLYMER AND METHOD FOR PRODUCING THE SAME

FIELD OF THE INVENTION

The present invention relates to a chlorosulphonated ethylene-α-olefin copolymer and a method for producing the same. More particularly, the invention relates to a chlorosulphonated ethylene-α-olefin copolymer having a chlorine content of 0.5-20% by weight and a glass transition temperature of −50° C. or lower and being crystalline, and a method for producing the same.

BACKGROUND ART

A chlorosulphonated polyethylene obtained by chlorinating and chlorosulphonating a high density polyethylene has excellent ozone resistance, weather-proof resistance, heat resistance and, oil resistance and chemical resistance, and due to such excellent properties, is used as wires, hoses, escalator handrails, and the like. However, because of poor low temperature property, the chlorosulphonated polyethylene is not used in belts for automobiles, boots, and the like. On the other hand, a chlorosulphonated ethylene-α-olefin copolymer disclosed in JP-B-5-17243 has excellent low temperature property as compared with a chlorosulphonated polyethylene using a high density polyethylene as a raw material, and therefore is applied to uses requiring low temperature property, to which the conventional chlorosulphonated polyethylene has been difficult to apply.

Patent publications (foe example, JP-A-9-176394, JP-A-8-67712 and JP-A-61-145204) relating to improvement of low temperature property of a chlorosulphonated ethylene-α-olefin copolymer are reported for expansion of application of the same to uses requiring low temperature property.

However, there is no report of a chlorosulphonated ethylene-α-olefin copolymer having a glass transition temperature of −50° C. or lower so as to further improve the low temperature property.

SUMMARY OF THE INVENTION

The present invention has been made in view of the above conventional problems.

Accordingly, one object of the present invention is to provide a chlorosulphonated ethylene-α-olefin copolymer having further improved low temperature property.

Another object of the present invention is to provide a method for producing the copolymer.

As a result of extensive investigations on the above problems, the present inventors have succeeded to obtain a chlorosulphonated ethylene-α-olefin copolymer having a glass transition temperature of −50° C. or lower, and have been completed the present invention.

The present invention provides a chlorosulphonated ethylene-α-olefin copolymer having a chlorine content of 0.5-20% by weight and a glass transition temperature in differential scanning calorimetry (DSC) of −50° C. or lower and being crystalline.

The present invention further provides a method for producing the chlorosulphonated ethylene-α-olefin copolymer, comprising chlorinating a crystalline ethylene-x-olefin copolymer having a density of 890 kg/m$^3$ or lower, obtained by copolymerizing x-olefin comprising a hydrocarbon having 4 or more carbon atoms, with ethylene, and then chlorosulphonating the chlorinated copolymer.

DETAILED DESCRIPTION OF THE INVENTION

The present invention is described in detail below.

The chlorosulphonated ethylene-α-olefin copolymer of the present invention has a chlorine content of 0.5-20% by weight. Where the chlorine content is less than 0.5% by weight, such a copolymer is not considered a chlorosulphonated ethylene-α-olefin copolymer. On the other hand, where the chlorine content exceeds 20% by weight, a chlorosulphonated ethylene-α-olefin copolymer having a glass transition temperature of −50° C. or lower cannot be obtained. The chlorine content is preferably 2-20% by weight, more preferably 5-20% by weight.

Sulfur content in the chlorosulphonated ethylene-α-olefin copolymer is not particularly limited, but is preferably limited to 3% by weight or lower to maintain storage stability of a compound, thermal stability of a cured product, and the like.

Mooney viscosity $ML_{1+4}$ (100° C.) of the chlorosulphonated ethylene-α-olefin copolymer is not particularly limited, but is preferably 10-200, more preferably 20-150, considering balance between processability and physical properties.

The glass transition temperature of the chlorosulphonated ethylene-α-olefin copolymer means a temperature at which the chlorosulphonated ethylene-α-olefin copolymer changes from a glass state to a state having rubber elasticity. The temperature can be analyzed by DSC. A sample obtained by previously hot pressing at 120° C. for 10 minutes and then being allowed to stand at 23° C. for 24 hours is mounted on a DSC device at room temperature. The measurement portion is quenched to −120° C. with liquid nitrogen, and maintained at that temperature for 5 minutes. Measurement is conducted in a temperature range of from −120° C. to 120° C. at a temperature rising rate of 10° C./min to obtain a DSC curve. In the DSC curve obtained, a glass transition temperature is obtained from a cross point of an extrapolated base line lower than the glass transition temperature and an extrapolated straight line portion of a glass transition temperature region.

The chlorosulphonated ethylene-α-olefin copolymer of the present invention is crystalline. The term "crystalline" used herein means that heat quantity of fusion D explained hereinafter is higher than 0 (zero). Due to being crystalline, a chlorosulphonated ethylene-α-olefin copolymer having excellent low temperature property is formed.

The chlorosulphonated ethylene-α-olefin copolymer of the present invention is preferably that heat quantity of fusion D (mJ/mg) by DSC and chlorine content X (wt %) are satisfied with the following formula, from the point of flexibility of the chlorosulphonated ethylene-α-olefin copolymer.

$$0 < D \leq -2.86X + 61.2$$

The chlorosulphonated ethylene-α-olefin copolymer of the present invention is more preferably that D and X are satisfied with the following formula, from the point of further improved flexibility of the chlorosulphonated ethylene-α-olefin copolymer.

$$0 < D \leq -2.22X + 45.7$$

In the above formulae, the heat quantity of fusion D is determined as follows. DSC measurement is conducted under the same conditions as in the measurement of the glass transition temperature described above. In a DSC curve obtained, value of heat quantity is calculated from an area surrounded by a straight line connecting a start point of fusion endothermic peak to a finish point thereof. The value obtained is divided by a sample weight to convert into mJ/mg unit. Where the start point is unclear, a base line at a high temperature side is extrapolated from a fusion endothermic peak to a low temperature side, and a heat quantity value is calculated from the surrounded area. The value obtained is divided by a sample weight to convert into mJ/mg unit.

The chlorosulphonated ethylene-α-olefin copolymer of the present invention is obtained by a method comprising chlorinating and chlorosulphonating an ethylene-α-olefin copolymer. Examples of the method include a solution method comprising dissolving the ethylene-α-olefin copolymer in solvent inert to halogenation reaction, such as chloroform, trichloroethane, tetrachloroethane, monochlorobenzene or chlorofluorobenzene, and conducting chlorination and chlorosulphonation in a homogeneous system, a suspension method comprising suspending the ethylene α-olefin copolymer in a solvent, and conducting reaction, and a vapor phase method comprising floating the ethylene-α-olefin copolymer in a vapor phase and conducting reaction. Of those methods, the solution method is preferable, considering flexibility of a rubber. Examples of a chlorinating agent and a chlorosulphonating agent used include a combination of chlorine and sulfur dioxide, a combination of chlorine and sulfuryl chloride, and sulfuryl chloride alone.

The ethylene-α-olefin copolymer used in the production of the chlorosulphonated ethylene-α-olefin copolymer of the present invention is obtained by copolymerizing α-olefin comprising a hydrocarbon having 4 or more carbon atoms with ethylene. Examples of the α-olefin comprising a hydrocarbon having 4 or more carbon atoms include butene-1, pentene-1, hexene-1 and octene-1. Chlorosulphonated ethylene-α-olefin copolymer using, as a raw material, an ethylene-α-olefin copolymer obtained by copolymerizing α-olefin comprising a hydrocarbon having 3 or less carbon atoms with ethylene cannot have a glass transition temperature of −50° C. or lower. The α-olefin comprising a hydrocarbon having 3 or less carbon atoms is, for example, propylene.

The ethylene-α-olefin copolymer used in the present invention is crystalline. The term "crystalline" used herein means that melting point of a crystal is observed by DSC. Use of the crystalline ethylene-α-olefin copolymer makes it possible to obtain a crystalline chlorosulphonated ethylene-α-olefin copolymer.

The ethylene-α-olefin copolymer used in the production method of the chlorosulphonated ethylene-α-olefin copolymer according to the present invention has a density of preferably 890 kg/m$^3$ or lower, more preferably 880 kg/m$^3$ or lower, most preferably 870 kg/m$^3$ or lower. Where the density exceeds 890 kg/m$^3$, flexibility of the chlorosulphonated ethylene-α-olefin copolymer obtain is impaired, which is not desirable.

The method for producing the chlorosulphonated ethylene-α-olefin copolymer according to the present invention comprises chlorinating the ethylene-α-olefin copolymer in an amount of 0.5-20% by weight, and then chlorosulphonating the copolymer. Where the chlorination is conducted in an amount less than 0.5% by weight, the copolymer obtained is not considered to be a chlorosulphonated ethylene-α-olefin copolymer. On the other hand, where the chlorination is conducted in an amount exceeding 20% by weight, a chlorosulphonated ethylene-α-olefin copolymer having a glass transition temperature of −50° C. or lower cannot be obtained. The chlorination is conducted in an amount of preferably 2-20% by weight, more preferably 5-18% by weight.

The above-described conditions are necessary for the production method of the chlorosulphonated ethylene-α-olefin copolymer according to the present invention. Other conditions are described below by referring to a general production method of the chlorosulphonated ethylene-α-olefin copolymer by a solution method.

Ethylene-α-olefin copolymer is dissolved in a solvent to obtain a uniform solution. A radical generator and sulfuryl chloride are added to such a reaction solution to conduct reaction. Reaction temperature is not particularly limited, but is generally 30-180° C. Reaction pressure is not particularly limited, but pressure of from atmospheric pressure to 1.0 megapascal is suitable. During the reaction, hydrogen chloride and sulfur dioxide generated are continuously purged outside the reaction system. Examples of the radical generator include azo radical generators such as α,α'-azobisisobutyronitrile, azobiscyclohexanecarbonitrile, or 2,2'-azobis(2,4-dimethylvaleronitrile); and organic peroxide radical generators such as benzoyl peroxide, t-butyl peroxide or acetyl peroxide. Ultraviolet ray may be irradiated in place of using the radical generator. Where reaction is conducted using sulfuryl chloride, amine compounds such as pyridine, quinoline, dimethylaniline, nicotine or piperidine are used as a co-catalyst, if necessary, in order to add chlorosulphone groups.

Amount of the ethylene α-olefin copolymer dissolved is not particularly limited, but is preferably 5-30% by weight to appropriately maintain viscosity when conducting reaction. After completion of the reaction, hydrogen chloride and sulfur dioxide dissolved in the solution are removed out of the system by blowing an inert gas such as nitrogen into the system under refluxing the solvent. If required and necessary, an epoxy compound is added as a stabilizing agent. The chlorosulphonated ethylene-α-olefin copolymer solution obtained is separated into a polymer and a solvent by steam distillation, drum drying, extrusion drying or the like.

The chlorosulphonated ethylene-α-olefin copolymer of the present invention is cured with curing agents, vulcanization accelerators, curing co-agents, fillers, plasticizers, processing aids, antioxidants or the like, and is used as a cured product. Those mixtures are blended and mixed with rolls, Banbury mixer or the like, and then subjected to press curing, steam curing, electron-ray curing or the like.

By curing the chlorosulphonated ethylene-α-olefin copolymer, the copolymer can be used as rubber parts for automobiles or industrial rubber parts. Examples of the rubber part for automobiles include weatherstrips, rubber vibration insulators, hoses, boots, belts, and air springs. Examples of industrial rubber parts include rubber vibration insulators, hoses, boots, belts, track pads, ballast mats, rubber bearings, packings, shoe soles, cables and covering materials thereof, wires and covering materials thereof, lining sheets for water storage pond, sealants, roofing sheets, escalator handrails, gaskets, rolls, linings, leisure boats, rainwears, and chemical resistance grooves. Besides those, the chlorosulphonated ethylene-α-olefin copolymer can also be used in adhesives, coatings, paints, primers and the like.

According to the present invention, a chlorosulphonated ethylene-α-olefin copolymer having a glass transition temperature of −50° C. or lower can be obtained.

As described above, it is apparent that a chlorosulphonated ethylene-α-olefin copolymer having a glass transition temperature of −50° C. or lower is obtained by the present invention.

The present invention is described in more detail by reference to the following examples, but it should be understood that those examples are to assist understanding the present invention, and the invention is not construed as being limited thereto.

Values used in the examples are according to the following measurements.

Measurement of Density

Density of an ethylene-x-olefin copolymer was measured according to JIS K-6992-1.

Measurement of Melt Index

Melt index of an ethylene-α-olefin copolymer was measured according to JIS K-6992-1 at a measurement temperature of 190° C.

Measurement of Chlorine Content and Sulfur Content

Content of chlorine and sulfur was measured by a combustion flask method. Chlorine content was measured as follows. 30 mg of chlorosulphonated polyolefin was burned according to an oxygen combustion flask method using 15 ml of 1.7 wt % hydrazinium sulfate aqueous solution as an absorbing solution, and then allowed to stand for 30 minutes. The absorbing solution alter this operation was washed out with 10 ml of pure water, and chlorine ions were quantified with a potential difference titration method using 0.05N silver nitrate aqueous solution to measure chlorine content.

Sulfur content was measured as follows. In the above measurement, 10 ml of 3 wt % hydrogen perxode was used as an absorbing solution in place of 15 ml of 1.7 wt % hydrazinium sulfate aqueous solution. After washing out with 40 ml of pure water, 1 ml of acetic acid, 100 ml of 2-propanol and 0.47 ml of Arsenazo III were added. The resulting solution was subjected to a light intensity titration method using 0.1N barium acetate solution to measure sulfate ions.

Measurement of Glass Transition Temperature, Heat Quantity of Fusion and Melting Point 10 mg is weighed out from a measurement sample that has previously be hot pressed at 120° C. for 10 minutes and then allowed to stand at 23° C. for 24 hours. The weighed sample is mounted on a differential scanning calorimeter (DSC 200, Seiko Instruments Inc.) at room temperature. The measurement portion is quenched with liquid nitrogen to −120° C., and maintained at that temperature for 5 minutes. Measurement is conducted in a temperature range of from −120° C. to 120° C. at a temperature rising rate of 10° C./min. In a DSC curve obtained, a glass transition temperature is obtained from a cross point of an extrapolated straight line of a glass transition temperature region and an extrapolated base line lower than the temperature. A value of heat quantity is calculated from an area surrounded by a straight line connecting a start point of fusion endothermic peak to a finish point thereof. The value obtained is divided by a sample weight to convert into mJ/mg unit. Where the start point of the fusion endothermic peak is unclear, a base line at a high temperature side is extrapolated from a fusion endothermic peak to a low temperature side, and a heat quantity value is calculated from the surrounded area. The value obtained is divided by a sample weight to convert into mJ/mg unit. Where plural endothermic peaks are observed at the top of the fusion endothermic peak region of the DSC curve, the highest temperature in the top temperatures of endothermic peaks is used as a melting point.

EXAMPLE 1

28 kg of 1,1,2-trichloroethane and 3.4 kg of ethylene-hexene-1 copolymer having a melt index of 1.6 g/10 min, a density of 890 kg/m$^3$ and a melting point of 85.7° C. were placed in a glass-lined autoclave of 30 liters. 0.5 g of pyridine as a co-catalyst for chlorosulphonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 10% by weight, a solution prepared by dissolving 2.2 g of α,α'-azobisisobutyronitrile as a radical initiator in 640 g of 1,1,2-trichloroethane was continuously added to the reactor, and simultaneously 1.7 kg of sulfuryl chloride was added to the reactor from other inlet, thereby conducting reaction. This operation took 3 hours. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-hexene-1 copolymer having a chlorine content of 10.8% by weight and a sulfur content of 0.30% by weight. As a result of DSC measurement of this chlorosulphonated ethylene-hexene-1 copolymer, the glass transition temperature was −51.3° C., and fusion heat quantity was 42.6 mJ/mg. Thus, a crystalline chlorosulphonated ethylene-α-olefin copolymer having a glass transition temperature of −50° C. or lower was obtained.

EXAMPLE 2

28 kg of 1,1,2-trichloroethane and 3.4 kg of ethylene-butene-1 copolymer having a melt index of 1.2 g/10 min, a density of 862 kg/m$^3$ and a melting point of 38.6° C. were placed in a glass-lined autoclave of 30 liters. 0.5 g of pyridine as a co-catalyst for chlorosulfonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 15% by weight, a solution prepared by dissolving 3 g of α,α'-azobisisobutyronitrile as a radical initiator in 900 g of 1,1,2-trichloroethane was continuously added to the reactor, and simultaneously 2.4 kg of sulfuryl chloride was added to the reactor from other inlet, thereby conducting reaction. This operation took 3 hours and 30 minutes. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 15.1% by weight and a sulfur content of 0.62% by weight. As a result of DSC measurement of this chlorosulphonated ethylene-butene-1 copolymer, the glass transition temperature was −51.3° C., and fusion heat quantity was 6.8 mJ/mg. Thus, a crystalline chlorosulphonated ethylene-α-olefin copolymer having a glass transition temperature of −50° C. or lower was obtained.

EXAMPLE 3

Example 2 was followed except that an ethylene-butene-1 copolymer having a melt index of 0.5 g/10 min, a density of 861 kg/m$^3$ and a melting point of −35.4° C. was used in place of the ethylene-butene-1 copolymer having a melt index of 1.2 g/10 min, a density of 862 kg/m$^3$ and a melting point of 38.6° C., and a chlorosulphonated polyolefin as a product was separated from the solvent.

As a result of analyzing the product, it was a chlorosulphonated ethylene-butene-1 copolymer having a chlorine content of 15.0% by weight and a sulfur content of 0.59% by weight. As a result of DSC measurement of this chlorosulphonated ethylene-butene-1 copolymer, the glass transition temperature was −51.4° C., and fusion heat quantity was 7.3 mJ/mg. Thus, a crystalline chlorosulphonated ethylene-α-olefin copolymer having a glass transition temperature of −50° C. or lower was obtained.

EXAMPLE 4

Example 2 was followed except that a ethylene-butene-1 copolymer having a melt index of 4.4 g/10 min, a density of 880 kg/m$^3$ and a melting point of 76.3° C. was used in place of the ethylene-butene-1 copolymer having a melt index of 1.2 g/10 min, a density of 862 kg/m$^3$ and a melting point of 38.6° C., and a chlorosulphonated polyolefin as a product was separated from the solvent.

As a result of analyzing the product, it was a chlorosulphonated ethylene-butene-1 copolymer having a chlorine content of 14.3% by weight and a sulfur content of 0.51% by weight. As a result of DSC measurement of this chlorosulphonated ethylene-butene-1 copolymer, the glass transition temperature was −51.6° C., and fusion heat quantity was 18.3 mJ/mg. Thus, a crystalline chlorosulphonated ethylene-α-olefin copolymer having a glass transition temperature of −50° C. or lower was obtained.

EXAMPLE 5

28 kg of 1,1,2-trichloroethane and 3.4 kg of ethylene-butene-1 copolymer having a melt index of 1.2 g/10 min, a density of 862 kg/m$^3$ and a melting point of 38.6° C. were placed in a glass-lined autoclave of 30 liters. 0.5 g of pyridine as a co-catalyst for chlorosulphonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 10% by weight, a solution prepared by dissolving 2.2 g of α,α'-azobisisobutyronitrile as a radical initiator in 640 g of 1,1,2-trichloroethane was continuously added to the reactor, and simultaneously 1.7 kg of sulfuryl chloride was added to the reactor from other inlet, thereby conducting reaction. This operation took 3 hours. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 10.5% by weight and a sulfur content of 0.37% by weight. As a result of DSC measurement of this chlorosulphonated ethylene-butene-1 copolymer, the glass transition temperature was −55.3° C., and fusion heat quantity was 12.9 mJ/mg. Thus, a crystalline chlorosulphonated ethylene-α-olefin copolymer having a glass transition temperature of −50° C. or lower was obtained.

EXAMPLE 6

Example 5 was followed except that a ethylene-butene-1 copolymer having a melt index of 0.5 g/10 min, a density of 861 kg/m$^3$ and a melting point of 35.4° C. was used in place of the ethylene-butene-1 copolymer having a melt index of 1.2 g/10 min, a density of 862 kg/m$^3$ and a melting point of 38.6° C., and a chlorosulphonated-polyolefin as a product was separated from the solvent.

As a result of analyzing the product, it was a chlorosulphonated ethylene-butene-1 copolymer having a chlorine content of 9.8% by weight and a sulfur content of 0.35% by weight. As a result of DSC measurement of this chlorosulphonated ethylene-butene-1 copolymer, the glass transition temperature was −55.8° C., and fusion heat quantity was 8.1 mJ/mg. Thus, a crystalline chlorosulphonated ethylene-α-olefin copolymer having a glass transition temperature of −50° C. or lower was obtained.

EXAMPLE 7

Example 2 was followed except that a ethylene-octene-1 copolymer having a melt index of 1.0 g/10 min, a density of 870 kg/m$^3$ and a melting point of 64.0° C. was used in place of the ethylene-butene-1 copolymer having a melt index of 1.2 g/10 min, a density of 862 kg/m$^3$ and a melting point of 38.6° C., and a chlorosulphonated polyolefin as a product was separated from the solvent.

As a result of analyzing the product, it was a chlorosulphonated ethylene-octene-1 copolymer having a chlorine content of 14.5% by weight and a sulfur content of 0.50% by weight. As a result of DSC measurement of this chlorosulphonated ethylene-octene-1 copolymer, the glass transition temperature was −52.1° C., and fusion heat quantity was 12.3 mJ/mg. Thus, a crystalline chlorosulphonated ethylene-α-olefin copolymer having a glass transition temperature of −50° C. or lower was obtained.

The results obtained in Examples 1-7 are shown in Table 1 below.

TABLE 1

|  | Example 1 | Example 2 | Example 3 | Example 4 | Example 5 | Example 6 | Example 7 |
|---|---|---|---|---|---|---|---|
| Ethylene-α-olefin copolymer | | | | | | | |
| α-olefin species | Hexene-1 | Butene-1 | Butene-1 | Butene-1 | Butene-1 | Butene-1 | Octene-1 |
| Melt index (g/10 min) | 1.6 | 1.2 | 0.5 | 4.4 | 1.2 | 0.5 | 1.0 |
| Density (kg/m$^3$) | 890 | 862 | 861 | 880 | 862 | 861 | 870 |
| Melting point (° C.) | 85.7 | 38.6 | 35.4 | 76.3 | 38.6 | 35.4 | 64.0 |
| Analysis of product | | | | | | | |
| Chlorine content (wt %) | 10.8 | 15.1 | 15.0 | 14.3 | 10.5 | 9.8 | 14.5 |
| Sulfur content (wt %) | 0.30 | 0.62 | 0.59 | 0.51 | 0.37 | 0.35 | 0.50 |
| Glass transition temperature (° C.) | −51.3 | −51.3 | −51.4 | −51.6 | −55.3 | −55.8 | −52.1 |
| Heat quantity of Fusion (mJ/mg) | 42.6 | 6.8 | 7.3 | 18.3 | 12.9 | 8.1 | 12.3 |

COMPARATIVE EXAMPLE 1

28 kg of 1,1,2-trichloroethane and 3.4 kg of ethylene-butene-1 copolymer having a melt index of 1.2 g/10 min, a density of 885 kg/m$^3$ and a melting point of 74.9° C. were placed in a glass-lined autoclave of 30 liters. 0.5 g of pyridine as a co-catalyst for chlorosulfonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 22% by weight, a solution prepared by dissolving 4.6 g of α,α'-azobisisobutyronitrile as a radical initiator in 1,320 g of 1,1,2-trichloroethane was continuously added to the reactor, and simultaneously 3.75 kg of sulfuryl chloride was added to the reactor from other inlet, thereby conducting reaction. This operation took 3 hours and 30 minutes. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 21.7% by weight and a sulfur content of 0.58% by weight. As a result of DSC measurement of this chlorosulphonated ethylene-butene-1 copolymer, the glass transition temperature was −39.9° C., and fusion heat quantity was 4.5 mJ/mg. Thus, a crystalline chlorosulphonated ethylene-α-olefin copolymer having a glass transition temperature of −50° C. or lower could not be obtained.

COMPARATIVE EXAMPLE 2

28 kg of 1,1,2-trichloroethane and 3.4 kg of ethylene-butene-1 copolymer having a melt index of 2.0 g/10 min, a density of 898 kg/m$^3$ and a melting point of 105.3° C. were placed in a glass-lined autoclave of 30 liters. 0.5 g of pyridine as a co-catalyst for chlorosulphonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 17% by weight, a solution prepared by dissolving 3.6 g of α,α'-azobisisobutyronitrile as a radical initiator in 1,030 g of 1,1,2-trichloroethane was continuously added to the reactor, and simultaneously 2.93 kg of sulfuryl chloride was added to the reactor from other inlet, thereby conducting reaction. This operation took 2 hours and 40 minutes. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 17.0% by weight and a sulfur content of 0.30% by weight. As a result of DSC measurement of this chlorosulphonated ethylene-butene-1 copolymer, the glass transition temperature was −48.4° C., and fusion heat quantity was 28.9 mJ/mg. Thus, a crystalline chlorosulphonated ethylene-α-olefin copolymer having a glass transition temperature of −50° C. or lower could not be obtained.

COMPARATIVE EXAMPLE 3

28 kg of 1,1,2-trichloroethane and 3.4 kg of ethylene-butene-1 copolymer having a melt index of 2.2 g/10 min, a density of 919 kg/m$^3$ and a melting point of 122° C. were placed in a glass-lined autoclave of 30 liters. 0.5 g of pyridine as a co-catalyst for chlorosulphonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 16% by weight, a solution prepared by dissolving 3.4 g of α,α'-azobisisobutyronitrile as a radical initiator in 970 g of 1,1,2-trichloroethane was continuously added to the reactor, and simultaneously 2.76 kg of sulfuryl chloride was added to the reactor from other inlet, thereby conducting reaction. This operation took 2 hours and 30 minutes. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 16.0% by weight and a sulfur content of 0.97% by weight. As a result of DSC measurement of this chlorosulphonated ethylene-butene-1 copolymer, the glass transition temperature was −40.3° C., and fusion heat quantity was 39.4 mJ/mg. Thus, a crystalline chlorosulphonated ethylene-α-olefin copolymer having a glass transition temperature of −50° C. or lower could not be obtained.

COMPARATIVE EXAMPLE 4

28 kg of 1,1,2-trichloroethane and 3.4 kg of ethylene-butene-1 copolymer having a melt index of 3.6 g/10 min, a density of 893 kg/m$^3$ and a melting point of 85.2° C. were placed in a glass-lined autoclave of 30 liters. 0.5 g of pyridine as a co-catalyst for chlorosulfonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 30% by weight, a solution prepared by dissolving 6 g of α,α'-azobisisobutyronitrile as a radical initiator in 1,800 g of 1,1,2-trichloroethane was continuously added to the reactor, and simultaneously 5.8 kg of sulfuryl chloride was added to the reactor from other inlet, thereby conducting reaction. This operation took 7 hours. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-butene-1 copolymer having a chlorine content of 30.1% by weight and a sulfur content of 0.30% by weight. As a result of DSC measurement of this chlorosulphonated ethylene-butene-1 copolymer, the glass transition temperature was −31.4° C., and fusion heat quantity was 0 mJ/mg. Thus, a crystalline chlorosulphonated ethylene-α-olefin copolymer having a glass transition temperature of −50° C. or lower could not be obtained.

COMPARATIVE EXAMPLE 5

28 kg of 1,1,2-trichloroethane and 3.4 kg of ethylene-propylene copolymer having a melt index of 3.9 g/10 min, a density of 870 kg/m$^3$ and a melting point of 50.5° C. were placed in a glass-lined autoclave of 30 liters. 0.5 g of pyridine as a co-catalyst for chlorosulphonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 10% by weight, a solution prepared by dissolving 2.2 g of α,α'-azobisisobutyronitrile as a radical initiator in 640 g of 1,1,2-trichloroethane was continuously added to the reactor, and simultaneously 1.7 kg of sulfuryl chloride was added to the reactor from other inlet, thereby conducting reaction. This operation took 3 hours. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-propylene copolymer having a chlorine content of 10.0% by weight and a sulfur content of 0.70% by weight. As a result of DSC measurement of this chlorosulphonated ethylene-propylene copolymer, the glass transition temperature was −47.9° C., and fusion heat quantity was 18.6 mJ/mg. Thus, a crystalline chlorosulphonated ethylene-α-olefin copolymer having a glass transition temperature of −50° C. or lower could not be obtained.

COMPARATIVE EXAMPLE 6

28 kg of 1,1,2-trichloroethane and 3.4 kg of ethylene-propylene copolymer having a melt index of 3.2 g/10 min, a density of 860 kg/m$^3$ and a melting point of 41.3° C. were placed in a glass-lined autoclave of 30 liters. 0.5 g of pyridine as a co-catalyst for chlorosulfonation reaction was added to the reactor. Steam was passed through a jacket of the reactor, and the reactor was maintained at 120° C. for 2 hours to uniformly dissolve polyethylene. During this operation, nitrogen gas was introduced into the reactor at a flow rate of 15 liters/min to remove air present in the reactor. To chlorinate up to 10% by weight, a solution prepared by dissolving 2.2 g of α,α'-azobisisobutyronitrile as a radical initiator in 640 g of 1,1,2-trichloroethane was continuously added to the reactor, and simultaneously 1.7 kg of sulfuryl chloride was added to the reactor from other inlet, thereby conducting reaction. This operation took 3 hours. During the period, pressure of the reactor was maintained at 0.2 megapascal. After completion of the reaction, pressure was returned to atmospheric pressure, and temperature of the reactor was lowered to 70° C. Nitrogen was introduced into the reactor while maintaining the temperature of the reactor at 70° C. to conduct deacidification of removing residual sulfur dioxide and hydrogen chloride in the reactor. The reaction solution after completion of the deacidification step was fed to a drum dryer heated to 165° C., and a chlorosulphonated polyolefin was separated as a product from the solvent.

As a result of analyzing the product, it was a chlorosulphonated ethylene-propylene copolymer having a chlorine content of 9.8% by weight and a sulfur content of 0.70% by weight. As a result of DSC measurement of this chlorosulphonated ethylene-propylene copolymer, the glass transition temperature was −48.9° C., and fusion heat quantity was 14.3 mJ/mg. Thus, a crystalline chlorosulphonated ethylene-α-olefin copolymer having a glass transition temperature of −50° C. or lower could not be obtained.

The results obtained in Comparative Examples 1-6 are shown in Table 2 below.

TABLE 2

| | Comparative Example 1 | Comparative Example 2 | Comparative Example 3 | Comparative Example 4 | Comparative Example 5 | Comparative Example 6 |
|---|---|---|---|---|---|---|
| Ethylene-α-olefin copolymer | | | | | | |
| α-olefin species | Butene-1 | Butene-1 | Butene-1 | Butene-1 | Propylene | Propylene |
| Melt index (g/10 min) | 1.2 | 2.0 | 2.2 | 3.6 | 3.9 | 3.4 |
| Density (kg/m$^3$) | 885 | 898 | 919 | 893 | 870 | 860 |
| Melting point (° C.) | 74.9 | 105.3 | 122 | 85.2 | 50.5 | 41.3 |
| Analysis of product | | | | | | |
| Chlorine content (wt %) | 21.7 | 17.0 | 16.0 | 30.1 | 10.0 | 9.8 |
| Sulfur content (wt %) | 0.58 | 0.30 | 0.97 | 0.30 | 0.70 | 0.70 |
| Glass transition temperature (° C.) | −39.9 | −48.4 | −40.3 | −31.4 | −47.9 | −48.9 |
| Heat quantity of Fusion (mJ/mg) | 4.5 | 28.9 | 39.4 | 0 | 18.6 | 14.3 |

It should further be apparent to those skilled in the art that various changes in form and detail of the invention as shown and described above may be made. It is intended that such changes be included within the spirit and scope of the claims appended hereto.

This application is based on Japanese Patent Application No. 2004-186149 filed Jun. 24, 2004, the disclosure of which is incorporated herein by reference in its entirety.

What is claimed is:

1. A chlorosulphonated ethylene-α-olefin copolymer wherein said α-olefin comprises a hydrocarbon having 4 or more carbon atoms, having a chlorine content of 0.5-20% by weight and a glass transition temperature in differential scanning calorimetry (DSC) of −50° C. or lower and being crystalline.

2. The copolymer as claimed in claim 1, wherein heat quantity of fusion D (mJ/mg) by differential scanning calorimetry and chlorine content X (wt %) are satisfied with the following formula:

$$0 < D \leq -2.86X + 61.2.$$

3. A method for producing the chlorosulphonated ethylene-α-olefin copolymer as claimed in claim 1, comprising chlorinating a crystalline ethylene-α-olefin copolymer having a density of 890 kg/m$^3$ or lower, obtained by copolymerizing α-olefin comprising a hydrocarbon having 4 or more carbon atoms, with ethylene, and then chlorosulphonating the chlorinated copolymer.

4. Rubber parts for automobiles or industrial rubber parts, obtained by curing the chlorosulphonated ethylene-α-olefin copolymer as claimed in claim 1.

5. Adhesives, coating materials, paints or primers, comprising the chlorosulphonated ethylene-α-olefin copolymer as claimed in claim 1.

* * * * *